UNITED STATES PATENT OFFICE.

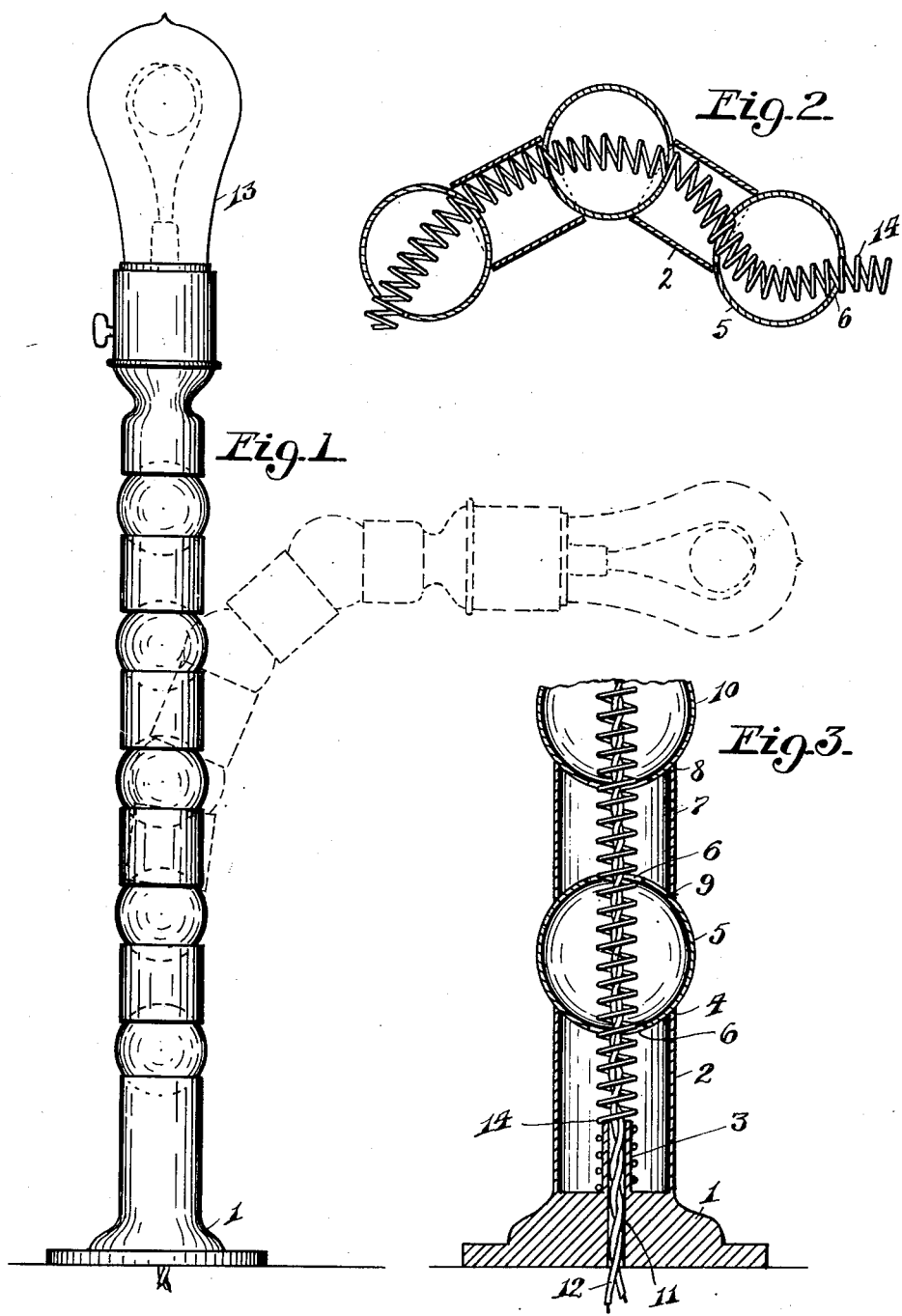

CHARLES E. STEVENS, OF SOUTH BEND, INDIANA, ASSIGNOR OF ONE-THIRD TO GEORGE W. LOUGHMAN AND ONE-THIRD TO JAMES H. LOUGHMAN, OF SOUTH BEND, INDIANA.

ADJUSTABLE LAMP-BRACKET.

936,379.   Specification of Letters Patent.   Patented Oct. 12, 1909.

Application filed March 5, 1909. Serial No. 481,289.

*To all whom it may concern:*

Be it known that I, CHARLES E. STEVENS, a citizen of the United States, residing at South Bend, in the county of St. Joseph and State of Indiana, have invented certain new and useful Improvements in Adjustable Lamp-Brackets, of which the following is a specification.

This invention relates to brackets for electric lamps.

The object of the invention is to provide a fixture in the form of a bracket of the nature stated, embodying such characteristics that it may be readily supported upon a desk, sewing machine or other place, the bracket having such flexible qualifications that it may be readily and quickly adjusted so that the lamp may be held or disposed at any desired position in close proximity to the desk, sewing machine or other place upon which the bracket may be supported.

With the above and other objects in view, the present invention consists in the combination and arrangement of parts more fully described, illustrated in the accompanying drawings and particularly pointed out in the appended claims, it being understood that changes may be made in the form, proportion, size and minor details without departing from the spirit or sacrificing any of the advantages of the invention.

In the drawings:—Figure 1 is a side elevation of my invention, the same being shown in dotted lines in adjusted position.
Fig. 2 shows a fragmentary view of the bracket in section. Fig. 3 is a fragmentary vertical sectional view.

Referring now more particularly to the accompanying drawings, the reference character 1 indicates a base provided with an upstanding hollow thimble 2 in the bottom of which latter is formed a stud 3. The upper end of the thimble 2 is beveled inwardly as indicated at 4, to provide a seat for the reception of the hollow spherical ball 5, which is provided with oppositely disposed openings 6 adapted to be disposed normally in vertical alinement with the aforesaid stud 3 of the thimble 2.

The reference character 7 indicates another thimble which has its upper and lower ends beveled inwardly at 8 and 9, respectively, the lower end being adapted to embrace the upper end of the hollow spherical ball 5 the upper end thereof adapted to form a seat upon which a second hollow spherical ball 10 is mounted, there being as many of these thimbles 7 and balls 10 as may be desired in building up a bracket of the present character, as will be evidenced in Fig. 1, and which does not need further description, as regards the number of thimbles and balls employed.

The base 1 is provided with a perforation 11, through which the electric wires 12 may be passed and which wires also pass through the openings 6 of the hollow spherical balls for connection with the lamp 13 in the usual manner, there being a helical spring 14 embracing the stud 3 to which it is secured at its lower end in any suitable manner and also embracing the electric wire 12 and passing upwardly through the thimbles 7 and the openings 6 of the hollow spherical balls in embracing relation to the electric wires 12 and secured in any suitable manner at its upper end to the lamp socket. The spring 14 holds the thimbles and balls in coöperative relation and insures flexibility of the bracket, and by virtue of the alternately disposed hollow balls with respect to the thimble, there is provided a continuous ball and socket joint connection, which provides for a positive flexible bracket for the purpose herein stated. The spring tends to hold the parts in such a strong frictional contact with each other that the bracket will remain in any position to which it may be adjusted, thereby overcoming the tendency of the spring to resume its normal position. In order to provide greater latitude of adjustment the spherical balls are formed hollow and the thimbles consist of cylindrical shells which permit the maximum range of movement for the spring within such hollow members, as plainly shown in Fig. 2 and consequently permit a wider range of adjustment for the bracket than could otherwise be obtained. An additional advantage of so forming these members results in a light construction and materially lessens the expense of manufacture. The thimbles are also formed so as to be flexible for the purpose of adjusting themselves more perfectly at their points of contact with the balls when the latter are not a perfect sphere, which imperfection may arise in the course of manufacture or in the assembling and handling of the parts, the object being to always have all parts in perfect frictional contact with each other.

What is claimed is:—

1. In a bracket of the character described, a base provided with a hollow upstanding thimble and a hollow stud rising from the base in spaced relation to the walls of said thimble, the base having a perforation formed in alinement with said hollow stud, the upper end of said thimble being beveled inwardly to provide a seat, a hollow spherical ball disposed upon said seat, a second thimble disposed upon the top of said ball and provided with a seat at its upper end, a second hollow spherical ball disposed upon the seat of said second thimble, alternately disposed thimbles and balls extending from the second mentioned hollow spherical ball, a lamp connected to the uppermost ball, all of the balls having oppositely disposed openings disposed in alinement with the aforesaid hollow stud and perforation of the base, electric wires passed through said perforation, stud and the openings of the balls and connected with said lamp, and a helical spring embracing said stud and secured thereto and passing upwardly through said thimbles and the openings of said balls and connected with the lamp and in embracing relation with said wires.

2. In a flexible lamp bracket, a base provided with a hollow upstanding cylindrical thimble and also provided with a perforation and an upstanding cylindrically shaped stud alining with said perforation and disposed in spaced relation and concentrically with said thimble, a plurality of hollow spherical balls and thimbles alternately arranged with each other with the lowermost ball resting upon the thimble of said base, all of the balls having oppositely disposed openings arranged preferably in alinement with said stud of the base, a lamp disposed upon the uppermost ball, electric wires passed through said perforation, the stud, the thimbles and the openings of said balls for connection with the lamp, and a helical spring embracing said stud and secured thereto and passing upwardly through said thimbles and the openings in the balls and connected at its upper end with the lamp, said helical spring embracing the electric wires confined within the balls and thimbles.

In testimony whereof I affix my signature, in presence of two witnesses.

CHARLES E. STEVENS.

Witnesses:
GEORGE OLTSCH,
G. M. COLE.